G. B. TURNER.
Flax Machine.

No. 44,128.

Patented Sept. 6, 1864.

Witnesses;

Inventor
G. B. Turner
By atty. A. B. Stoughton

UNITED STATES PATENT OFFICE.

G. B. TURNER, OF CUYAHOGA FALLS, OHIO.

IMPROVEMENT IN MACHINES FOR BREAKING AND CLEANING FLAX.

Specification forming part of Letters Patent No. 44,128, dated September 6, 1864.

*To all whom it may concern:*

Be it known that I, G. B. TURNER, of Cuyahoga Falls, in the county of Summit and State of Ohio, have invented certain new and useful Improvements in Machines for Removing the Shives from Flax Fiber; and I do hereby declare the following to be a full, clear, and exact description of the construction and operation of the same, reference being had to the accompanying drawings, making a part of this specification, in which—

Figure 1:
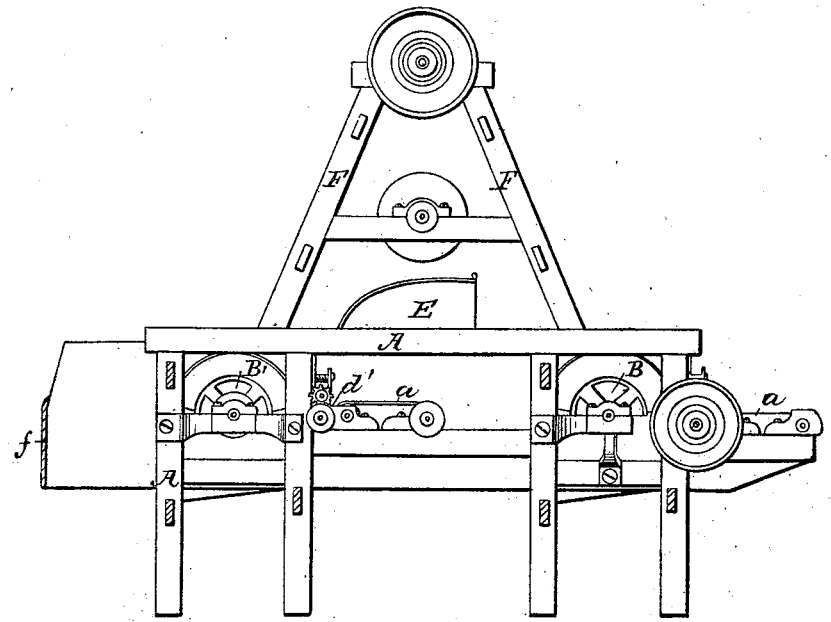
Figure 2:
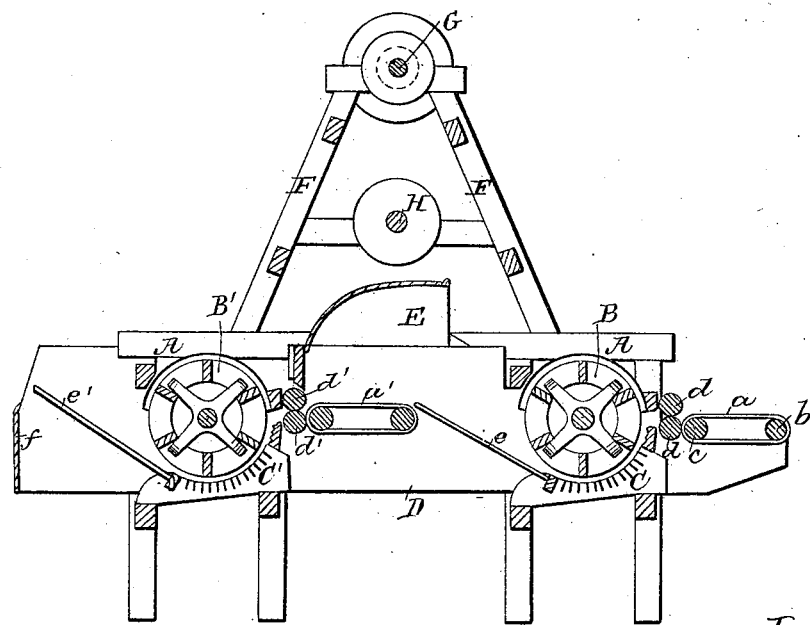

Figure 1 represents a side view of the machine. Fig. 2 represents a vertical longitudinal section through the same.

Similar letters of reference, where they occur, denote like parts in all the figures.

When flax is pulled or even cut by hand, the stalks may be laid and kept comparatively straight, and when it is dressed the fiber is kept in its naturally long and straight condition. The present scarcity of labor, the wants and demands of the community, and the economical preparation and supply of flax fiber require that some more expeditious and cheap process of gathering and preparing the fiber should be practiced.

Heretofore, in the production of flax fiber, what has been termed the "tow" (the coarser fiber of the plant) has been by hackling or combing entirely separated from the finer fiber, and thus much of the valuable fiber lost or so impaired as to be very much reduced in value. It is reduced to an almost certain proposition that flax raised in quantities must be harvested or cut by machinery, the old plan of hand-pulling being too expensive to make it a paying crop; but from the very nature of the flax-plant, while it may be cut and gathered by machinery, it would be very difficult to keep or lay the stalks straight, because the small branches at its top, upon which the heads or pods grow, so entangle and hold onto each other as to prevent anything like a clean separation, without which the plants or stalks cannot be kept straight and in compact form. I propose, in the first place, to cut the flax by machinery; to gather it in bulk, without regard to its being straight or in bunches; to rot, and break it in bulk, and, finally, to remove the shives or woody portion of the plant from the fiber by passing it through a machine such as I have invented, in its mixed or tangled condition; but I do not propose to separate what is usually termed the "tow" (the coarse fiber) from the flax, (the finer fiber.) I make the whole fiber into (what I shall term) "tow," so that in respect to straightness of fiber it shall resemble cotton fiber, and be worked and spun as cotton is. Nor do I propose to pay any attention to the laying of the fiber in lengths such as the plant itself may furnish, but to allow the stalks and their product to run into mass or bulk, and merely remove the shives or woody portion of the plant from the fiber, preserving all the fiber.

Of the cutting, gathering, rotting, or breaking of the flax my present invention does not treat, further than I take the flax, which has been cut, gathered, rotted, and broken in bulk or mass, and subject it in that condition to treatment in my machine, so as to leave the fiber in the condition of tow, and by "tow" I mean the whole fiber of the plant, without regard to its being straight or in lengths, as flax has heretofore been kept. I feed in the broken flax to my machine just as wool, cotton, hair, or any other substance in bulk is fed into any machine, to be acted on therein regardless of how the broken stalks may lie, whether straight, crossed, tangled, or otherwise.

My invention consists in feeding in the broken stalks by means of endless belts and feeding-rolls—one or both—and subjecting it to a beating process over an open concave, through which the shives may drop, and then forcing the partially-cleaned fiber up and over fingers, which admit of another screening operation; then, by means of a canopy or its equivalent, gathering, guiding, and directing the fiber onto a second apron and feeding-rolls—one or both—and through a second beating and screening operation, substantially like the first, which will, under ordinary circumstances or conditions of the stalks, complete the separation of the shives from the fiber. If not, then a third process may be applied, and a fourth; or the partially-cleaned fiber may be run through the machine a second time.

To enable others skilled in the art to make, use, and apply my invention, I will proceed to describe the same with reference to the drawings.

A represents a main frame, upon which is mounted an endless feeding belt or apron, $a$, passing over and around the pulleys $b$ $c$, of which one, $c$, is driven by a positive motion, as will be hereinafter described. The flax-stalks in a loose condition, and after they have been put through a break of any ordinary kind, are laid or thrown upon this apron $a$, and carried along until they are caught between the feed-rolls $d$ $d$, which are also driven by a positive motion, and which carry the stalks through between them, where they are acted upon by a beater, B, which is a winged cylinder running at a high velocity, and which knocks off or out of the fiber the broken shives or woody portion of the plant. Underneath this beating-cylinder B there is an open concave, C, through which the detached shives may drop out of the machine. The beating-cylinder by its high velocity also creates a current or blast of air, which, together with the impelled force directly applied to the partially-cleaned fiber or tow, throws it against an inclined screen or series of fingers, $e$, where a further separation of the shives from the tow is made, the shives dropping out below through the opening D in the bottom of the machine. The force applied to the tow by the speed and blast from the beater carries the tow over and past the inclined screen or fingers $e$, and into or under a canopy, E, which gathers, guides, and directs the tow onto a second feeding-apron, $a'$, and to a second pair of feeding-rolls, $d'$ $d'$, which take it and pass it through to the action of a second beating-cylinder, B', working over an open concave, C', and from whence the tow is driven against and over a second inclined screen or series of fingers, $e'$, for another separation of the shives from the tow. The force and blast of the second beater, B', will send the tow out several feet from the end of the machine, and it will be found to be entirely divested of the shive or woody portion of the flax-plant, or nearly so. If the condition of the flax be such that the operation above described does not sufficiently clear the tow of the shives the operation may be repeated upon the same machine; or a second pair, set, or series of beaters, feeders, and screens may be applied; or the series may consist of three, four, or more beaters, with the necessary feeding and conveying contrivances between them, as herein described.

Motion may be communicated to the several moving parts of the machine as follows: On top of the main frame A there is a secondary or additional frame, F, suitably braced and supported, upon the top of which is a pulley-shaft, G, that may receive its motion from any first mover, and by means of belts passing over its pulleys and over those on an intermediate pulley-shaft, H, and the pulleys upon the beater-shaft, the feed-roll shaft or journal, and the apron shaft or journal, all the parts may be properly driven.

A wind-board, $f$, may be used at the rear of the machine or in rear of the series of inclined fingers $e$ $e'$, to prevent the force of the blast from driving the shives through into the fiber escaping over or beyond the fingers.

I have spoken of saving or converting into tow all the fiber of the flax. I ought probably to qualify that term, as there is a very coarse woody fiber that adheres to and goes out with the shives. This, though it may be called "fiber," is not worth preserving.

Having thus fully described the nature, objects and purpose of my invention, what I claim therein as new, and desire to secure by Letters Patent, is—

In combination with the sets, pairs, or series of feeders and beaters, the inclined screen or fingers for raising up the tow or fiber and screening the shives therefrom, and the canopy to gather, guide, and direct the tow from the first to the second series of feeders and beaters and screeners, substantially as and for the purpose herein described and represented.

G. B. TURNER.

Witnesses:
   A. B. STOUGHTON,
   EDM. F. BROWN.